(12) United States Patent
Katsukura

(10) Patent No.: US 11,168,909 B2
(45) Date of Patent: Nov. 9, 2021

(54) REPLICATING AIR CONDITIONER SETTINGS AND SCHEDULES

(71) Applicant: Mitsubishi Electric Corporation, Tokyo (JP)

(72) Inventor: Makoto Katsukura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/500,545

(22) PCT Filed: Jun. 23, 2017

(86) PCT No.: PCT/JP2017/023137
§ 371 (c)(1),
(2) Date: Oct. 3, 2019

(87) PCT Pub. No.: WO2018/235253
PCT Pub. Date: Dec. 27, 2018

(65) Prior Publication Data
US 2020/0109871 A1    Apr. 9, 2020

(51) Int. Cl.
*F24F 11/56* (2018.01)
*F24F 11/30* (2018.01)
(Continued)

(52) U.S. Cl.
CPC .............. *F24F 11/30* (2018.01); *F24F 11/56* (2018.01); *F24F 11/64* (2018.01); *F24F 11/65* (2018.01);
(Continued)

(58) Field of Classification Search
CPC .. F24F 11/30; F24F 11/64; F24F 11/65; F24F 11/56; G05B 19/042; G05B 2219/2614;
(Continued)

(56) References Cited

U.S. PATENT DOCUMENTS

2008/0137139 A1     6/2008   Yamada
2013/0268128 A1*   10/2013   Casilli ................... G05D 23/19
                                                          700/276
(Continued)

FOREIGN PATENT DOCUMENTS

EP      3 070 554 A1      9/2016
JP      2008-027127 A     2/2008
(Continued)

OTHER PUBLICATIONS

Extended European Search Report dated May 25, 2020 issued in corresponding EP patent application No. 17914376.3.
(Continued)

*Primary Examiner* — Kenneth M Lo
*Assistant Examiner* — Michael W Choi
(74) *Attorney, Agent, or Firm* — Posz Law Group, PLC

(57) ABSTRACT

In a management system including a first management apparatus, a second management apparatus and an information processing terminal, the first management apparatus managing operation of a first facility apparatus, the second management apparatus managing operation of a second facility apparatus, the information processing terminal obtains first setting data for managing the operation of the first facility apparatus from the first management apparatus, converts the first setting data into second setting data, the second management apparatus being able to use the second setting data, and sends the second setting data by radio to the second management apparatus, and the second management apparatus receives the second setting data by radio, and manages the operation of the second facility apparatus by using the second setting data.

6 Claims, 16 Drawing Sheets

(51) Int. Cl.
   *F24F 11/64* (2018.01)
   *F24F 11/65* (2018.01)
   *G05B 19/042* (2006.01)

(52) U.S. Cl.
   CPC .... *G05B 19/042* (2013.01); *G05B 2219/2614* (2013.01)

(58) Field of Classification Search
   CPC ........ G05B 19/0426; G05B 2219/2642; G06F 13/00
   USPC ......................................................... 700/276
   See application file for complete search history.

(56) References Cited

U.S. PATENT DOCUMENTS

| | | | | |
|---|---|---|---|---|
| 2016/0209059 A1* | 7/2016 | Castillo | ................... | H04W 4/70 |
| 2016/0234186 A1* | 8/2016 | Leblond | .................. | H04L 63/08 |
| 2017/0016643 A1* | 1/2017 | Combe | ................... | G05G 1/00 |
| 2017/0054615 A1* | 2/2017 | Wilson | ................... | H04W 4/50 |
| 2018/0074471 A1* | 3/2018 | Poplawski | ............... | F24F 11/62 |
| 2018/0080672 A1 | 3/2018 | Yamamoto et al. | | |

FOREIGN PATENT DOCUMENTS

| | | |
|---|---|---|
| JP | 2008-146434 A | 6/2008 |
| JP | 2011-015188 A | 1/2011 |
| JP | 2012-129860 A | 7/2012 |
| JP | 2014-214935 A | 11/2014 |
| JP | 2016-194402 A | 11/2016 |

OTHER PUBLICATIONS

International Search Report of the International Searching Authority dated Aug. 1, 2017 for the corresponding international application No. PCT/JP2017/023137 (and English translation).

Office Action dated Jun. 16, 2020 issued in corresponding JP application No. 2019-524818 (and English translation).

\* cited by examiner

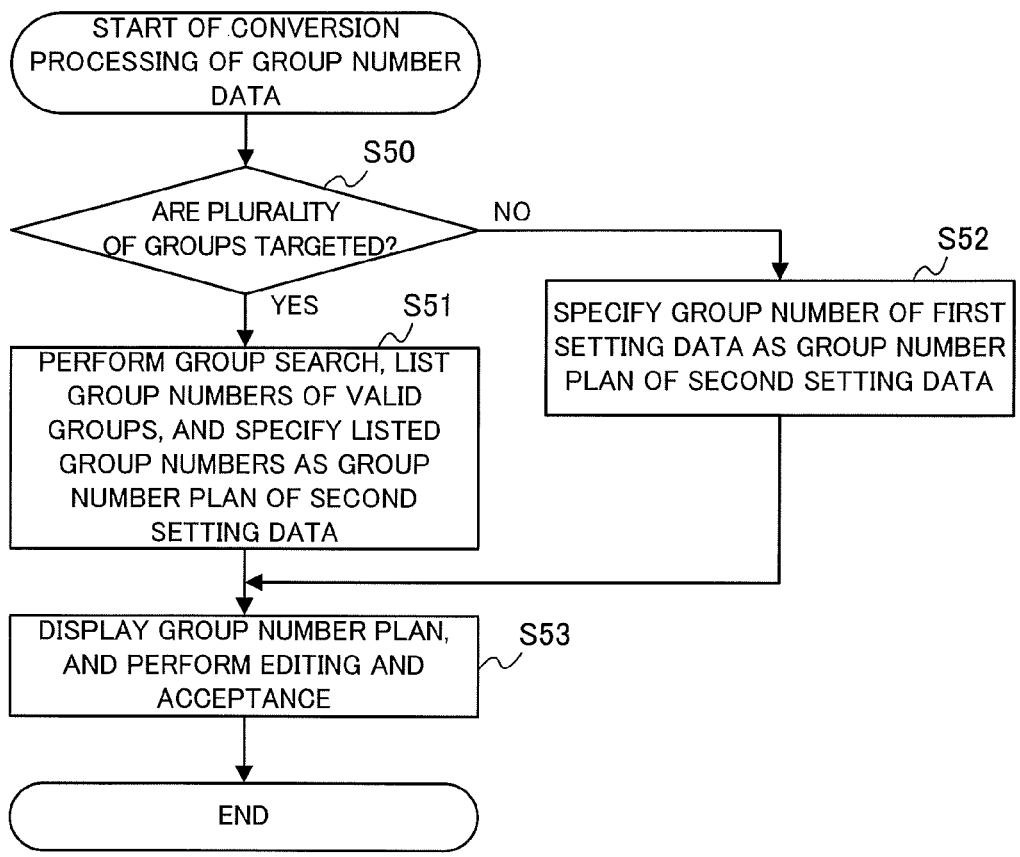

| SETTING TEMPERATURE CONVERSION TABLE ||
|---|---|
| FIRST FACILITY APPARATUS | SECOND FACILITY APPARATUS |
| 30.5°C | 30°C |
| 29.5°C | 29°C |
| 14°C | 17°C |
| ⋮ | ⋮ |

| AIR VOLUME CONVERSION TABLE ||
|---|---|
| FIRST FACILITY APPARATUS | SECOND FACILITY APPARATUS |
| BREEZE | WEAK |
| WEAK | WEAK |
| STRONG | STRONG |
| ⋮ | ⋮ |

| AIR DIRECTION CONVERSION TABLE ||
|---|---|
| FIRST FACILITY APPARATUS | SECOND FACILITY APPARATUS |
| DOWNWARD | DOWNWARD |
| AUTO | DOWNWARD |
| ⋮ | ⋮ |

174a · 174b

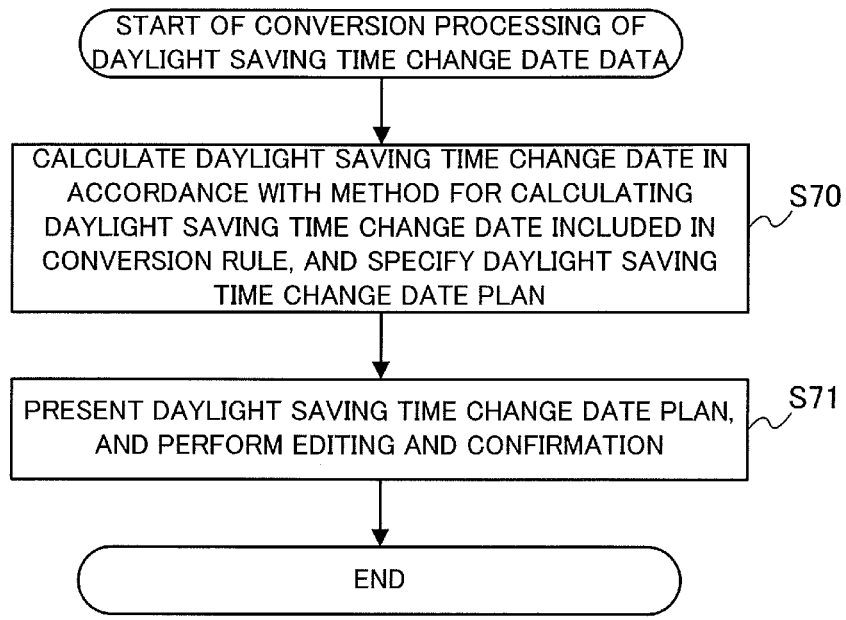
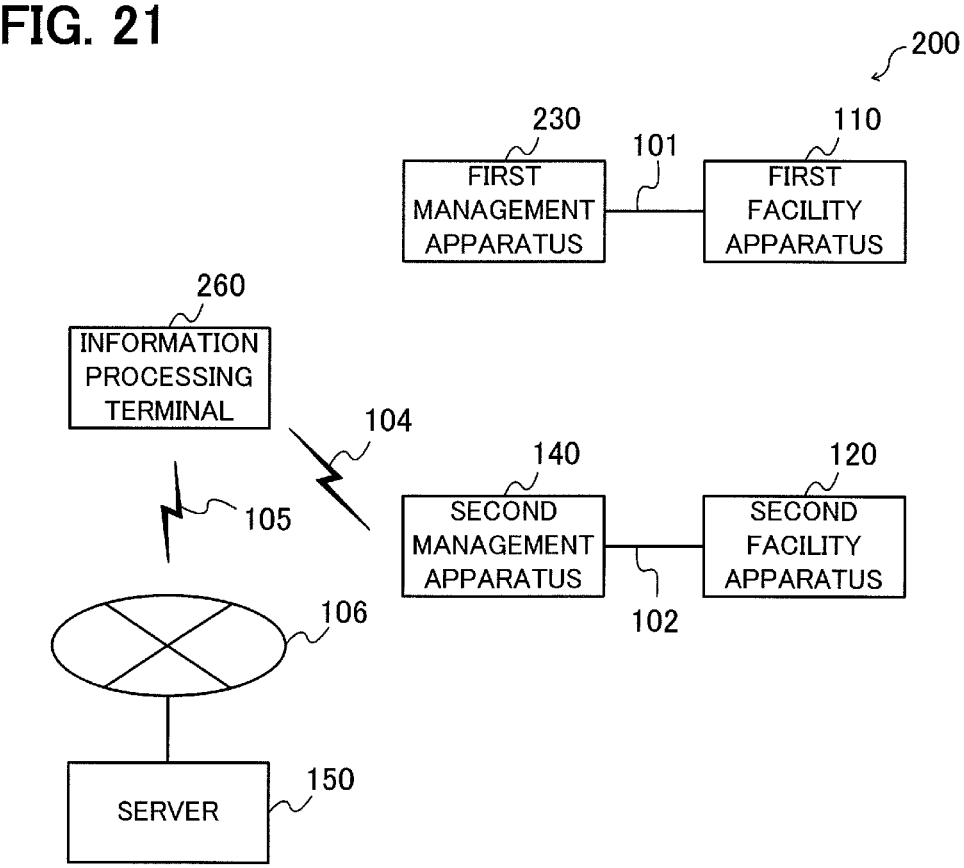

REPLICATING AIR CONDITIONER SETTINGS AND SCHEDULES

CROSS REFERENCE TO RELATED APPLICATION

This application is a U.S. national stage application of International Patent Application No. PCT/JP2017/023137 filed on Jun. 23, 2017, the disclosure of which is incorporated herein by reference.

TECHNICAL FIELD

The present invention relates to a management system and, more particularly, to a management system to manage the operation of a facility apparatus.

BACKGROUND

When a facility apparatus has reached the end of its service life, the facility apparatus is replaced. In replacing the facility apparatus, a management apparatus, for example, a controller such as a remote controller, associated with the facility apparatus is also replaced. In doing this, contents set in the management apparatus or the facility apparatus need to set again in a new management apparatus or facility apparatus, so that considerable time and effort are required.

Under the circumstances, technology for performing, for example, operation setting by accessing the management apparatus by radio from an information processing terminal such as a smartphone is available (see, for example, patent reference 1).

PATENT REFERENCE

Patent Reference 1: Japanese Patent Application Publication No. 2014-214935

In the conventional technology, setting data of an existing management apparatus cannot be used as setting data of a management apparatus to be newly installed. In particular, when the model of an existing facility apparatus is different from that of a facility apparatus to be newly installed, since the data forms and the like also differ, the setting data cannot be used in the management apparatus to be newly installed even if the setting data are simply transferred.

Setting data associated with the scheduled operation of the facility apparatus by the management apparatus causes trouble especially. For example, air conditioners have various models such as a model capable of both cooling and heating and a model capable of only cooling. Since a schedule for the model capable of both cooling and heating can also include heating operation, a management apparatus of the model capable of only cooling cannot use such a schedule.

In practice, furthermore, since different models have differences and constraints in setting data that cannot be identified by a user, the user eventually, inevitably performs setting from the first again.

SUMMARY

In view of this, this invention has been made to solve the above-described problems, and has as its object to make it possible to easily take over setting data from one management apparatus to another management apparatus.

A management system according to an aspect of the present invention is provided as a management system including a first management apparatus, a second management apparatus and an information processing terminal, the first management apparatus managing operation of a first facility apparatus, the second management apparatus managing operation of a second facility apparatus, wherein the information processing terminal includes a conversion unit to obtain first setting data for managing the operation of the first facility apparatus from the first management apparatus and to convert the first setting data into second setting data, the second management apparatus being able to use the second setting data, and a first terminal-side communication unit to send the second setting data by radio to the second management apparatus, and the second management apparatus includes a second apparatus-side communication unit to receive the second setting data by radio, and a management unit to manage the operation of the second facility apparatus by using the second setting data.

According to an aspect of the present invention, it is possible to easily take over setting data from one management apparatus to another management apparatus.

BRIEF DESCRIPTION OF THE DRAWINGS

FIG. 12 is a flowchart illustrating conversion processing of group number data in Embodiment 1.

FIG. 13 is a schematic diagram illustrating an example of operation mode conversion data for converting an operation mode in Embodiment 1.

FIG. 14 is a schematic diagram illustrating an example of setting temperature conversion data for converting a setting temperature in Embodiment 1.

FIG. 15 is a schematic diagram illustrating an example of air volume conversion data for converting an air volume in Embodiment 1.

FIG. 16 is a schematic diagram illustrating an example of air direction conversion data for converting an air direction in Embodiment 1.

FIG. 20 is a flowchart illustrating conversion processing of daylight saving time change date data in Embodiment 1.

FIG. 21 is a block diagram schematically illustrating a configuration of a management system according to Embodiment 2.

DETAILED DESCRIPTION

Embodiment 1

Figure 1:
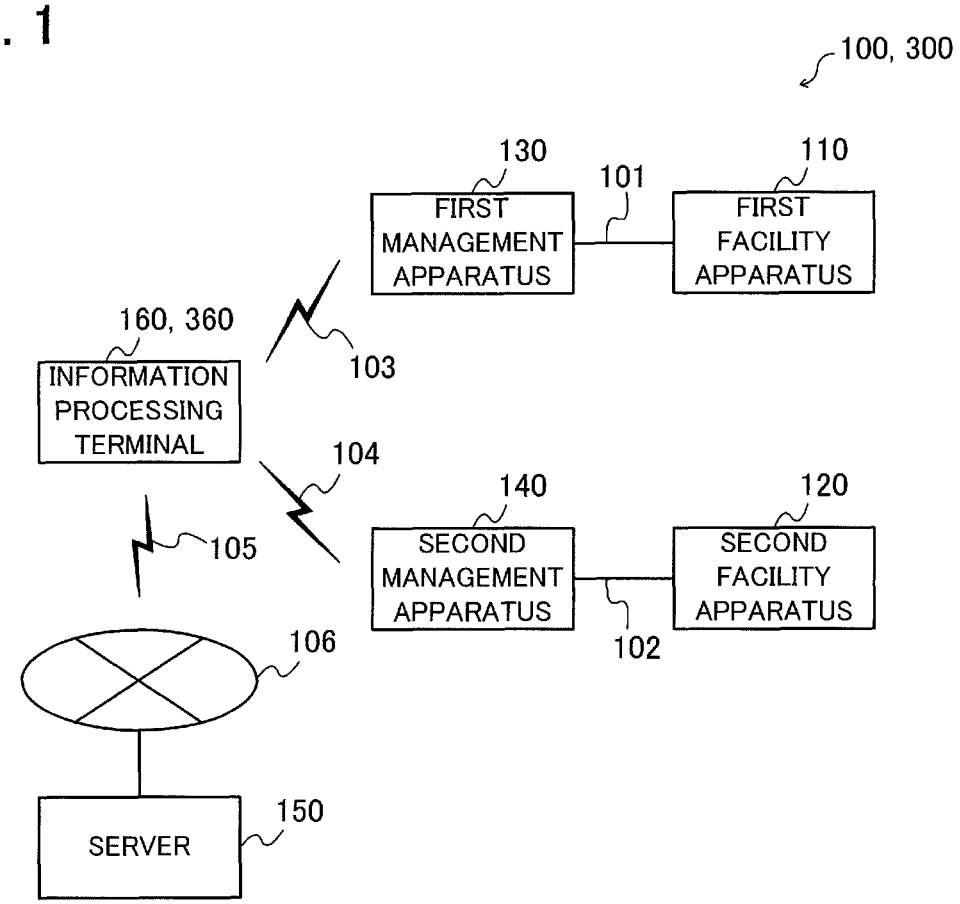
FIG. 1 is a block diagram schematically illustrating a configuration of a management system according to each of Embodiments 1 and 3.

FIG. 1 is a block diagram schematically illustrating a configuration of a management system 100 according to Embodiment 1.

The management system 100 includes a first facility apparatus 110, a second facility apparatus 120, a first management apparatus 130, a second management apparatus 140, a server 150, and an information processing terminal 160.

The first facility apparatus 110 and the first management apparatus 130 perform communication by wire 101. The first facility apparatus 110 and the first management apparatus 130 may perform communication by radio (not illustrated).

The second facility apparatus 120 and the second management apparatus 140 perform communication by wire 102. Note that the second facility apparatus 120 and the second management apparatus 140 may perform communication by radio (not illustrated).

The first management apparatus 130 and the information processing terminal 160 perform communication by radio 103.

The second management apparatus 140 and the information processing terminal 160 perform communication by radio 104.

The information processing terminal 160 is connectable by radio 105 to the Internet 106 as a network, and communicates with the server 150 connected to the Internet 106.

The first facility apparatus 110 serves as, for example, a household electrical appliance, which is an air conditioner to control a temperature in a specific space in Embodiment 1.

The second facility apparatus 120 also serves as, for example, a household electrical appliance, which is an air conditioner to control a temperature in a specific space in Embodiment 1.

The operation of the first facility apparatus 110 is managed (controlled) from the first management apparatus 130, and the operation of the second facility apparatus 120 is managed (controlled) from the second management apparatus 140. When the first facility apparatus 110 and the second facility apparatus 120 serve as air conditioners, the first management apparatus 130 and the second management apparatus 140 serve as remote controllers for the air conditioners.

Figure 2:
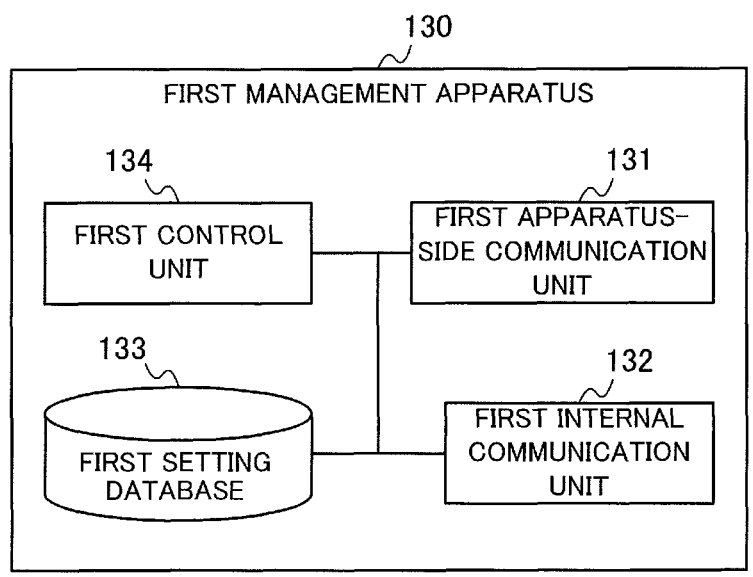
FIG. 2 is a block diagram schematically illustrating a configuration of a first management apparatus in Embodiment 1.

FIG. 2 is a block diagram schematically illustrating a configuration of the first management apparatus 130.

The first management apparatus 130 includes a first apparatus-side communication unit 131, a first internal communication unit 132, a first setting database 133, and a first control unit 134.

The first apparatus-side communication unit 131 communicates with the information processing terminal 160 via the radio 103. The first apparatus-side communication unit 131 serves as, for example, a communication device to perform communication in accordance with Bluetooth (a registered trademark). More specifically, the first apparatus-side communication unit 131 is implemented by a radio communication module using, for example, a 2.4-GHz-band radio frequency.

The first internal communication unit 132 communicates with the first facility apparatus 110 via the wire 101.

The first setting database 133 serves as a first apparatus-side storage unit to store setting data (first setting data) for managing the operation of the first facility apparatus 110. The first setting data includes a plurality of setting values for managing the operation of the first facility apparatus 110.

Figure 3:
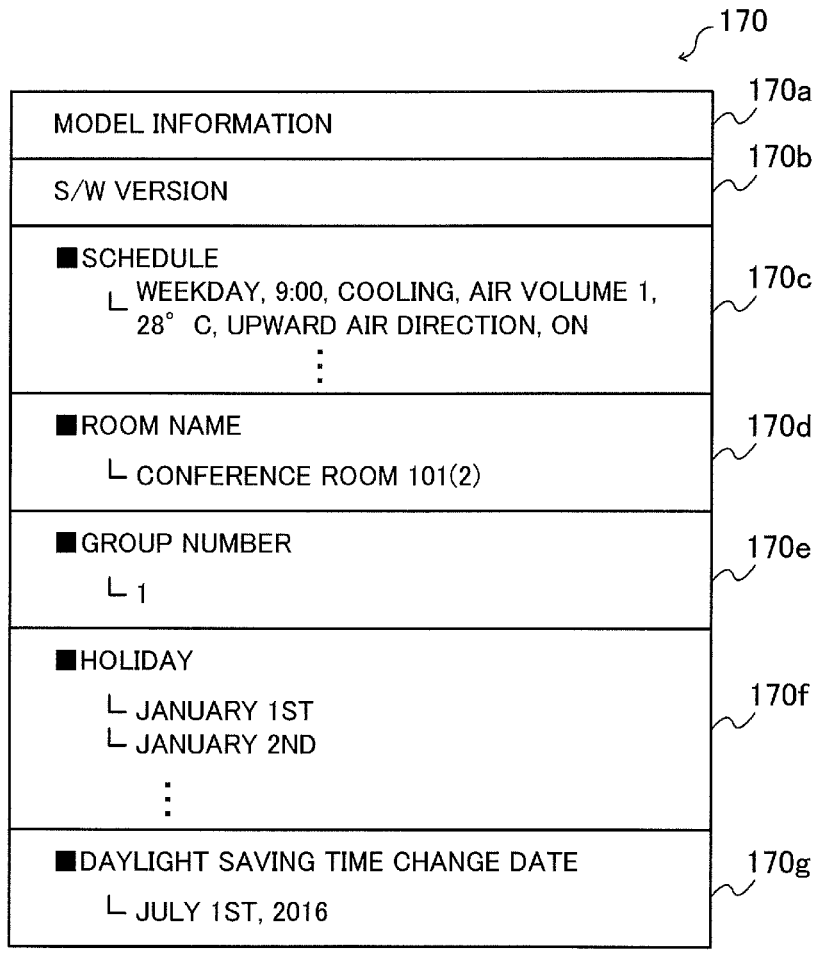
FIG. 3 is a schematic diagram illustrating an example of first setting data in Embodiment 1.

FIG. 3 is a schematic diagram illustrating an example of first setting data.

First setting data 170 includes model information 170a, an S/W version 170b, schedule data 170c, room name data 170d, group number data 170e, holiday data 170f, and daylight saving time change date data 170g.

The model information 170a indicates the model of the first facility apparatus 110. The model information 170a indicates, for example, the model number of the first facility apparatus 110. The model information 170a can specify a function that the first facility apparatus 110 is able to perform. For example, the model information 170a specifies that the first facility apparatus 110 is a model capable of heating operation, auto air direction operation, or breeze and weak air volume operation. The model information 170a is obtained by making an exchange with the first facility apparatus 110.

The S/W version 170b indicates the version of software executed by the first management apparatus 130. The S/W version 170b is managed by the first control unit 134 of the first management apparatus 130.

The schedule data 170c indicates a schedule according to which the first management apparatus 130 operates the first facility apparatus 110. A weekday or a holiday, a time of day, an operation mode, an air volume, a setting temperature, an air direction, and a way that the first management apparatus 130 controls a power supply of the first facility apparatus 110, for example, are defined in the schedule data 170c.

The room name data 170d is character string data indicating the name of a room in which the first management apparatus 130 is installed. The room name data 170d in Embodiment 1 indicates not only an installation location in which the first management apparatus 130 is installed, but also, by using a figure put into parentheses, a ordinal number in installation order in which the first management apparatus 130 is installed in the installation location.

The group number data 170e indicates a group number of a group to which the first facility apparatus 110 belongs. The group number is a symbol used when a plurality of facility apparatuses are controlled collectively. When, for example, the first management apparatus 130 designates cooling operation for group 1, not only the first facility apparatus 110, but also other facility apparatuses (not illustrated) assigned with group 1 perform the same operation.

The holiday data 170f is data for distinguishing between weekdays and holidays in scheduled operation. Normally, Saturday and Sunday, for example, are automatically assigned to the holidays, while a holiday such as a public holiday or a company-specific nonbusiness day is set separately.

The daylight saving time change date data 170g designates dates to make a change to a daylight saving time used in Europe and North America. For example, a change to a daylight saving time is made at "1:00 a.m. on the Last Sunday in March" in Europe, or at "2:00 a.m. on the First Sunday in April" in North America.

Since dates to make changes to holidays and a daylight saving time are stipulated by law in each country, it is necessary to change setting when the law is changed. As will be described later, the server 150 performs conversion of these pieces of information according to the latest information in data conversion.

The schedule data 170c, the room name data 170d, the group number data 170e, the holiday data 170f, and the daylight saving time change date data 170g are data set in the first management apparatus 130 by a user or in advance.

With reference to FIG. 2 again, the first control unit 134 controls processing in the first management apparatus 130.

For example, the first control unit 134 sends, to the information processing terminal 160 via the first apparatus-side communication unit 131, the first setting data stored in the first setting database 133, in response to a request from the information processing terminal 160. This request is a setting data obtaining request for obtaining setting data.

The first control unit 134 functions as a management unit (first management unit) to manage the operation of the first facility apparatus 110 by using the first setting data.

Figure 4:
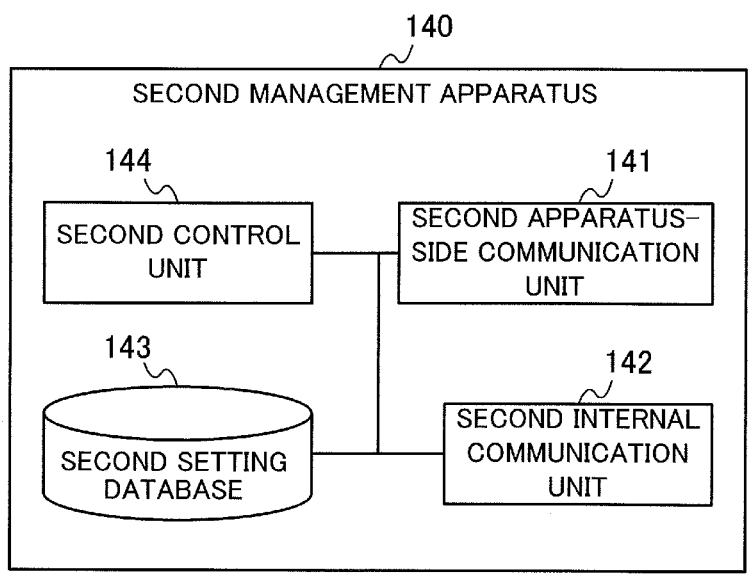
FIG. 4 is a block diagram schematically illustrating a configuration of a second management apparatus in Embodiment 1.

FIG. 4 is a block diagram schematically illustrating a configuration of the second management apparatus 140.

The second management apparatus 140 includes a second apparatus-side communication unit 141, a second internal communication unit 142, a second setting database 143, and a second control unit 144.

The second apparatus-side communication unit 141 communicates with the information processing terminal 160 via the radio 104. The second apparatus-side communication unit 141 serves as, for example, a communication device to perform communication in accordance with Bluetooth. More specifically, the second apparatus-side communication unit 141 is implemented by a radio communication module using, for example, a 2.4-GHz-band radio frequency.

The second internal communication unit 142 communicates with the second facility apparatus 120 via the wire 102.

The second setting database 143 serves as a second apparatus-side storage unit to store setting data (second setting data) for managing the operation of the second facility apparatus 120. The second setting data includes a plurality of setting values for managing the operation of the second facility apparatus 120.

The second control unit 144 controls processing in the second management apparatus 140.

For example, the second control unit 144 sends, to the information processing terminal 160 via the second apparatus-side communication unit 141, model information indicating the model of the second facility apparatus 120, and an S/W version indicating the version of software executed by the second management apparatus 140, in response to a request from the information processing terminal 160. This request is an information obtaining request for obtaining information.

The second control unit 144 receives, via the second apparatus-side communication unit 141, second setting data sent together with a request from the information processing terminal 160, and causes the second setting database 143 to store the second setting data. This request is a setting request for setting the setting values included in the setting data.

The second control unit 144 functions as a management unit (second management unit) to manage the operation of the second facility apparatus 120 by using the second setting data stored in the second setting database 143. More specifically, the second control unit 144 manages the operation of the second facility apparatus 120 by using the setting values included in the second setting data stored in the second setting database 143. The second control unit 144 may manage the operation of the second facility apparatus 120 by directly using the setting values included in the second setting data stored in the second setting database 143, or may manage the operation of the second facility apparatus 120 by storing, in storage devices such as memories (not illustrated) of the second facility apparatus 120 and the second management apparatus 140, the setting values included in the second setting data stored in the second setting database 143.

Figure 5A:
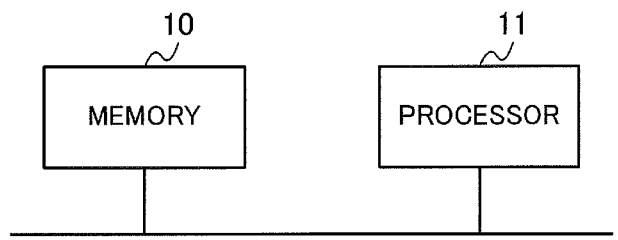
FIGS. 5(A) and 5(B) are schematic diagrams illustrating an example of hardware configurations.

Part or the whole of the above-mentioned first control unit 134 and second control unit 144 can be implemented by, for example, a memory 10, and a processor 11 such as a central processing unit (CPU) to execute a program stored in the memory 10, as illustrated in FIG. 5(A). This program may be provided through a network, or may be provided as a recording medium recording the program. That is, this program may be provided as, for example, a program product.

Figure 5B:
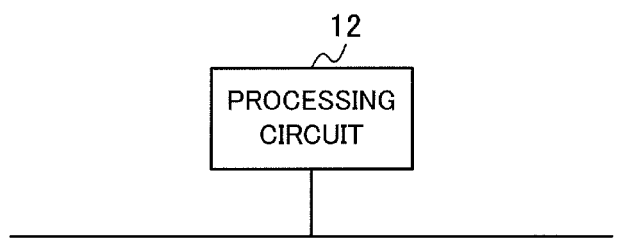

Part or the whole of the first control unit 134 and the second control unit 144 can also be implemented by, for example, a processing circuit 12 such as a single circuit, a complex circuit, a programmed processor, a parallel-programmed processor, application specific integrated circuits (ASICs), or a field programmable gate array (FPGA), as illustrated in FIG. 5(B).

Each of the first setting database 133 and the second setting database 143 can be implemented by a nonvolatile memory such as an electrically erasable and programmable read only memory (E2PROM).

Figure 6:
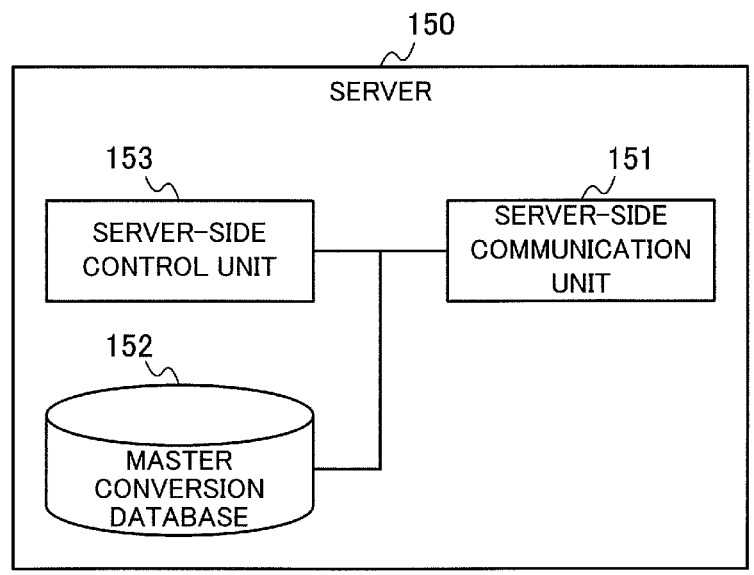
FIG. 6 is a block diagram schematically illustrating a configuration of a server in Embodiment 1.

FIG. 6 is a block diagram schematically illustrating a configuration of the server 150.

The server 150 includes a server-side communication unit 151, a master conversion database 152, and a server-side control unit 153.

The server-side communication unit 151 communicates with the Internet 106. For example, the server-side communication unit 151 can be implemented by a communication device such as a network interface card (NIC).

The master conversion database 152 serves as a server-side storage unit to store a conversion rule. The conversion rule is a rule for converting setting data for managing the operation of one facility apparatus into setting data for managing the operation of another facility apparatus. The conversion rule includes a program and conversion data. The program included in the conversion rule is a program for executing processing required to convert one piece of setting data into another piece of setting data. The conversion data is data indicating a setting value (first setting value) of one piece of setting data, and a setting value (second setting value) corresponding to the former setting value in another piece of setting data.

A plurality of conversion rules are generated for each combination of model information and an S/W version of a conversion source, and model information and an S/W version of a conversion destination, and each of the plurality of conversion rules can be identified by the combination.

Conversion rules in all combinations are stored in the master conversion database 152.

The server-side control unit 153 sends, to the information processing terminal 160 via the server-side communication unit 151, the conversion rules stored in the master conversion database 152, in response to a request from the information processing terminal 160. For example, the information processing terminal 160 can receive a conversion rule corresponding to a combination of model information and an S/W version of a conversion source, and model information and an S/W version of a conversion destination, by notifying the server 150 of the combination. This request is a conversion rule obtaining request for obtaining a conversion rule.

Part or the whole of the above-mentioned server-side control unit 153 can be implemented by, for example, a memory 10, and a processor 11 such as a CPU to execute a program stored in the memory 10, as illustrated in FIG. 5(A). This program may be provided through a network, or may be provided as a recording medium recording the program. That is, this program may be provided as, for example, a program product.

Part of the server-side control unit 153 can also be implemented by, for example, a processing circuit 12 such as a single circuit, a complex circuit, a programmed processor, a parallel-programmed processor, ASICs, or an FPGA, as illustrated in FIG. 5(B).

The master conversion database 152 can be implemented by a storage device such as a nonvolatile memory or a hard disc drive (HDD).

Figure 7:
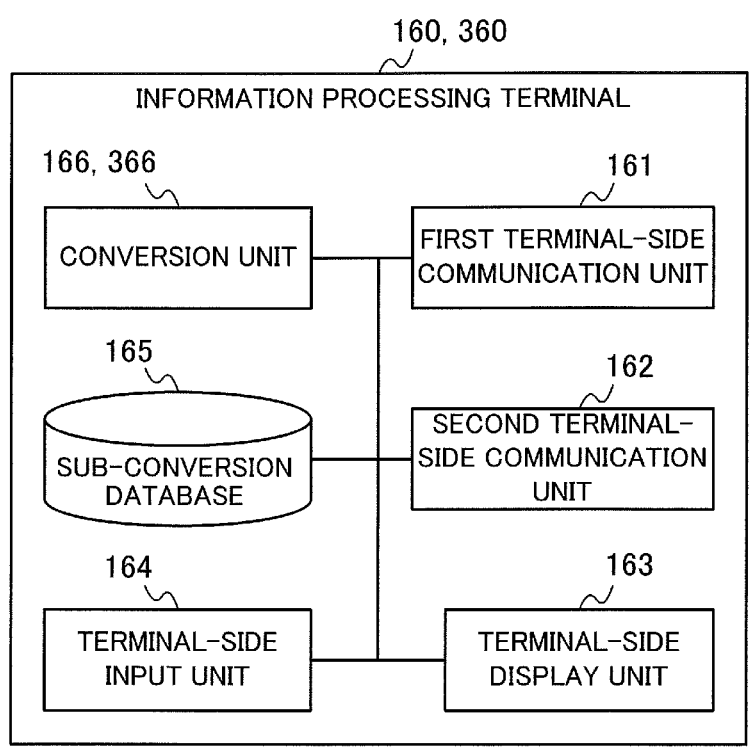
FIG. 7 is a block diagram schematically illustrating a configuration of an information processing terminal in each of Embodiments 1 and 3.

FIG. 7 is a block diagram schematically illustrating a configuration of the information processing terminal 160.

The information processing terminal 160 includes a first terminal-side communication unit 161, a second terminal-side communication unit 162, a terminal-side display unit 163, a terminal-side input unit 164, a sub-conversion database 165, and a conversion unit 166.

The first terminal-side communication unit 161 communicates with the first management apparatus 130 or the second management apparatus 140 via the radio 103 or 104. The first terminal-side communication unit 161 serves as, for example, a communication device to perform communication in accordance with Bluetooth. More specifically, the first terminal-side communication unit 161 is implemented by a radio communication module using, for example, a 2.4-GHz-band radio frequency.

The second terminal-side communication unit 162 communicates with the Internet 106 via the radio 105. The second terminal-side communication unit 162 serves as, for example, a communication device connectable to a mobile communication network. The mobile communication network is connectable to the Internet 106.

The terminal-side display unit 163 displays various screen images.

The terminal-side input unit 164 receives input of an instruction from a user.

The terminal-side display unit 163 and the terminal-side input unit 164 can be implemented by, for example, a touch screen.

The sub-conversion database 165 serves as a terminal-side storage unit to store a conversion rule.

For example, the sub-conversion database 165 stores a conversion rule obtained from the server 150 via the second terminal-side communication unit 162. The conversion rule stored in the sub-conversion database 165 can also be searched for by using a combination of model information and an S/W version of a conversion source, and model information and an S/W version of a conversion destination.

The conversion unit 166 converts setting data in accordance with the conversion rule.

For example, the conversion unit 166 sends a setting data obtaining request to the first management apparatus 130 via the first terminal-side communication unit 161 to obtain first setting data via the first terminal-side communication unit 161 as a response to this request.

The conversion unit 166 further sends an information obtaining request to the second management apparatus 140 via the first terminal-side communication unit 161 to obtain the model information of the second facility apparatus 120 and the S/W version of the second management apparatus 140 as a response to this request.

The conversion unit 166 sets the model information and the S/W version (the model information of the first facility apparatus 110 and the S/W version of the first management apparatus 130) included in the first setting data as model information and an S/W version of a conversion source, and the model information of the second facility apparatus 120 and the S/W version of the second management apparatus 140 as model information and an S/W version of a conversion destination, and obtains, from the sub-conversion database 165, a conversion rule identified by the combination.

When a corresponding conversion rule has not been stored in the sub-conversion database 165, the conversion unit 166 obtains the corresponding conversion rule by sending a conversion rule obtaining request including the combination from the second terminal-side communication unit 162 to the server 150.

The conversion unit 166 converts first setting data for managing the operation of the first facility apparatus 110 into second setting data that can be used by the second management apparatus 140, in accordance with the obtained conversion rule.

By sending the second setting data to the second management apparatus 140 together with a setting request via the first terminal-side communication unit 161, the conversion unit 166 causes the second management apparatus 140 to manage the operation of the second facility apparatus 120 by using the second setting data.

Part or the whole of the above-mentioned conversion unit 166 can be implemented by, for example, a memory 10, and a processor 11 such as a CPU to execute a program stored in the memory 10, as illustrated in FIG. 5(A). This program may be provided through a network, or may be provided as a recording medium recording the program. That is, this program may be provided as, for example, a program product.

Part or the whole of the conversion unit 166 can also be implemented by, for example, a processing circuit 12 such as a single circuit, a complex circuit, a programmed processor, a parallel-programmed processor, ASICs, or an FPGA, as illustrated in FIG. 5(B).

The sub-conversion database 165 can be implemented by a nonvolatile memory such as flash memory.

Figure 8:
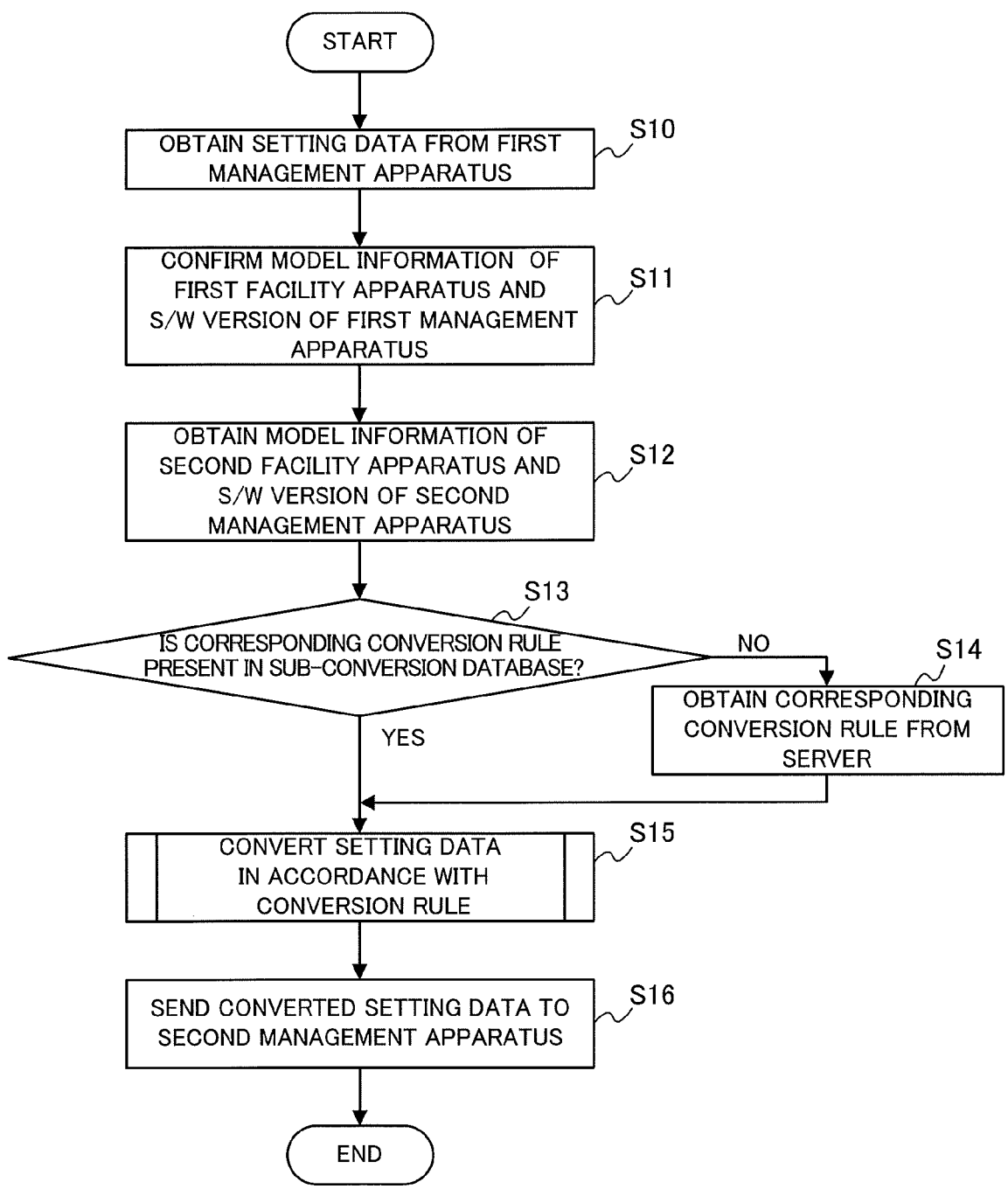
FIG. 8 is a flowchart illustrating operation in which a conversion unit obtains first setting data from the first management apparatus, converts the first setting data into second setting data, and sets the second setting data in the second management apparatus, in Embodiment 1.

FIG. 8 is a flowchart illustrating operation in which the conversion unit 166 obtains first setting data from the first management apparatus 130, converts the first setting data into second setting data, and sets the second setting data in the second management apparatus 140, in Embodiment 1.

The conversion unit 166 obtains first setting data from the first management apparatus 130 (S10). More specifically, the conversion unit 166 sends a setting data obtaining request to the first management apparatus 130 via the first terminal-side communication unit 161. The first control unit 134 of the first management apparatus 130 reads out the first setting data stored in the first setting database 133, and sends the first setting data to the information processing terminal 160 via the first apparatus-side communication unit 131, as a response to the setting data obtaining request.

The conversion unit 166 obtains the model information of the first facility apparatus 110 and the S/W version of the first management apparatus 130 (S11). More specifically, the conversion unit 166 extracts the model information and the S/W version from the first setting data obtained in step S10.

The conversion unit 166 obtains the model information of the second facility apparatus 120 and the S/W version of the second management apparatus 140 (S12). More specifically, the conversion unit 166 sends an information obtaining request to the second management apparatus 140 via the first terminal-side communication unit 161. The second control unit 144 of the second management apparatus 140 reads out the model information of the second facility apparatus 120 and the S/W version of the second management apparatus 140 from the second setting database 143, and sends the read model information and S/W version to the information processing terminal 160 via the second apparatus-side communication unit 141, as a response to the information obtaining request.

The conversion unit 166 searches the sub-conversion database 165 to determine whether a conversion rule for conversion from the first management apparatus 130 to the second management apparatus 140 is present (S13). For example, the conversion unit 166 sets the model information and the S/W version obtained in step S11 as model information and an S/W version of a conversion source, and the model information and the S/W version obtained in step S12 as model information and an S/W version of a conversion destination, and can determine whether a conversion rule corresponding to a combination of these pieces of model information and S/W versions is present, by searching the sub-conversion database 165 for the conversion rule. If the conversion rule is absent (No in step S13), the process proceeds to step S14; or if the conversion rule is present (Yes in step S13), the process proceeds to step S15.

In step S14, the conversion unit 166 obtains a corresponding conversion rule from the server 150 via the second terminal-side communication unit 162. For example, the conversion unit 166 sends, to the server 150 via the second terminal-side communication unit 162, a conversion rule obtaining request, together with information indicating a combination of the model information and the S/W version of the conversion source obtained in step S11, and the model information and the S/W version of the conversion destination obtained in step S12. The server-side control unit 153 of the server 150 reads out the corresponding conversion rule by searching the master conversion database 152, based on the received information indicating the combination. The server-side control unit 153 sends the read conversion rule to the information processing terminal 160 via the server-side communication unit 151. The conversion unit 166 receives the conversion rule via the second terminal-side communication unit 162 and stores it in the sub-conversion database 165. The process then proceeds to step S15.

In step S15, the conversion unit 166 converts the first setting data obtained in step S10 into second setting data, in accordance with the conversion rule searched for in step S13 or the conversion rule obtained in step S14. The process in step S15 will be described in detail with reference to FIG. 9.

The conversion unit 166 sends, to the second management apparatus 140 via the first terminal-side communication unit 161, the second setting data generated in step S15, together with a setting request (S16). In the second management apparatus 140, the second control unit 144 receives the second setting data via the second apparatus-side communication unit 141, and stores the second setting data in the second setting database 143. For example, the second control unit 144 overwrites the second setting data stored in the second setting database 143 with the received second setting data. The second control unit 144 manages the operation of the second facility apparatus 120 by using the second setting data.

Figure 9:
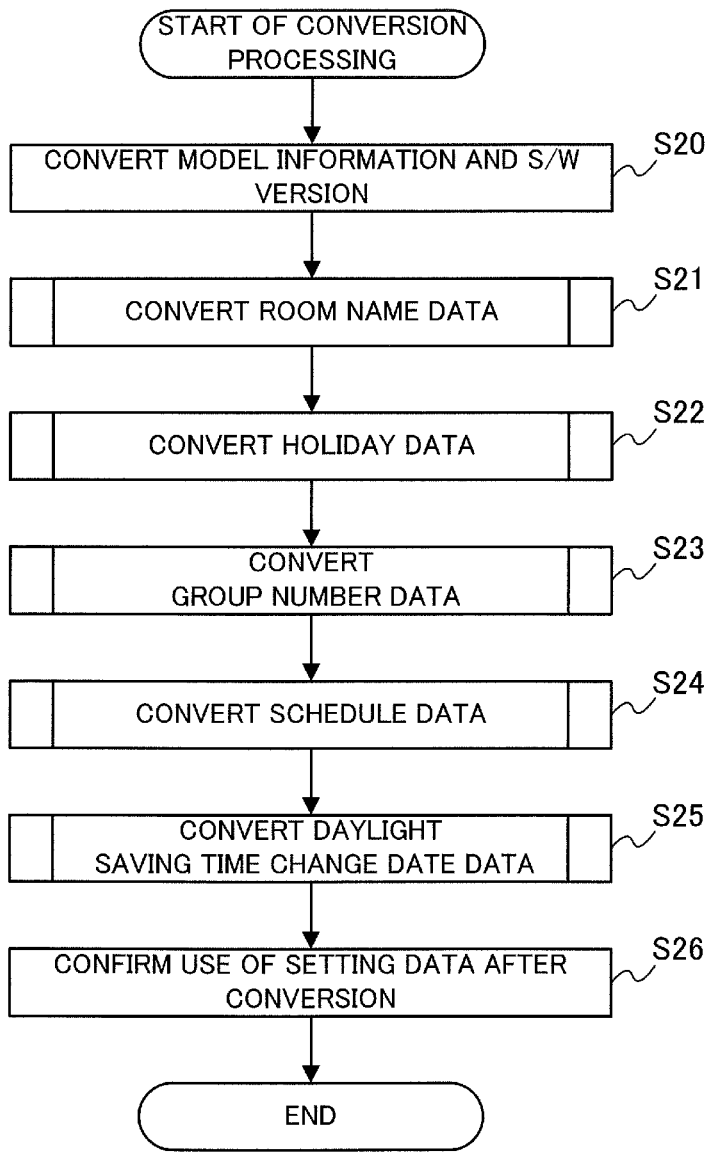
FIG. 9 is a flowchart illustrating conversion processing of setting data in Embodiment 1.

FIG. 9 is a flowchart illustrating conversion processing of setting data.

FIG. 9 is a flowchart illustrating details of the process in step S15 of FIG. 8.

First, the conversion unit 166 converts the model information and the S/W version of the first setting data into model information and an S/W version of a conversion destination (S20). For example, the conversion unit 166 converts the model information and the S/W version included in the first setting data obtained in step S10 of FIG. 8 into the model information of the second facility apparatus 120 and the S/W version of the second management apparatus 140 obtained in step S12 of FIG. 8.

The conversion unit 166 converts room name data of the first setting data (S21). This processing will be described in detail with reference to FIG. 10.

The conversion unit 166 converts holiday data of the first setting data (S22). This processing will be described in detail with reference to FIG. 11.

The conversion unit 166 converts group number data of the first setting data (S23). This processing will be described in detail with reference to FIG. 12.

The conversion unit 166 converts schedule data of the first setting data (S24). This processing will be described in detail with reference to FIG. 17.

The conversion unit 166 converts daylight saving time change date data of the first setting data (S25). This processing will be described in detail with reference to FIG. 20.

The conversion unit 166 displays, on the terminal-side display unit 163, a screen image representing the setting values of the setting data after conversion, and receives confirmation as to whether the setting data after conversion is to be used, from a user via the terminal-side input unit 164 (S26). If the confirmation has been received from the user, the sequence ends.

Figure 10:
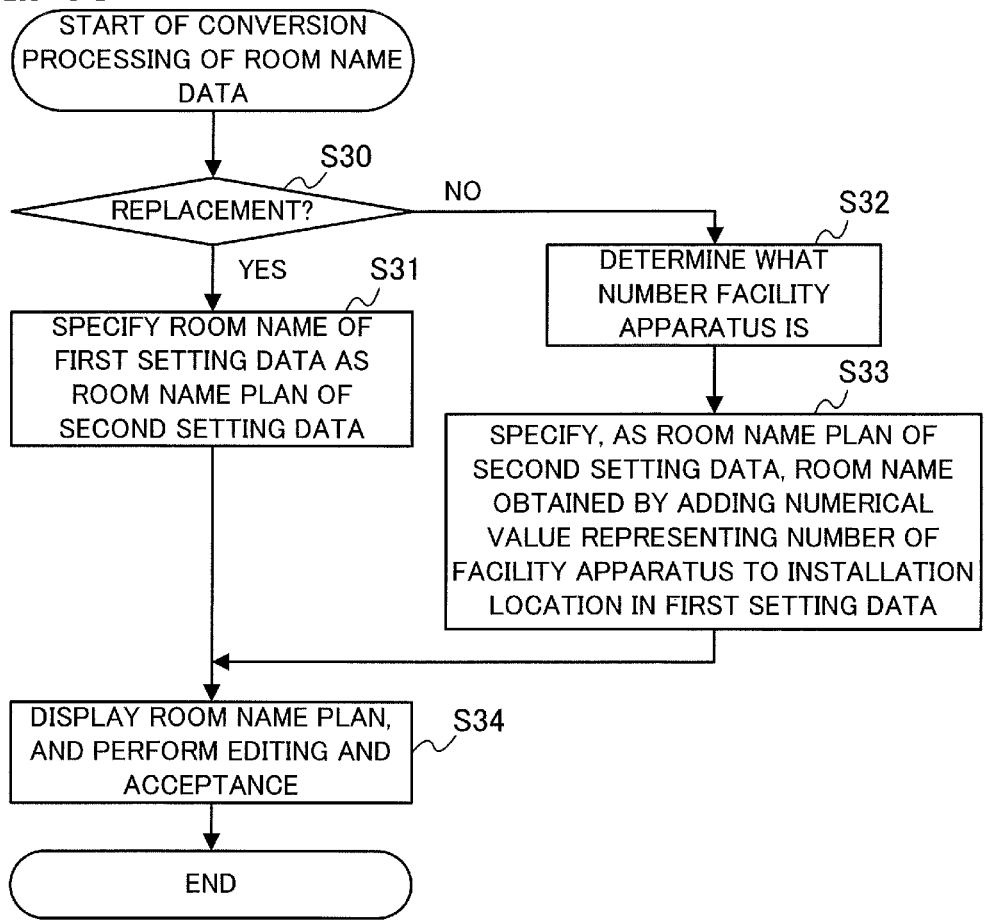
FIG. 10 is a flowchart illustrating conversion processing of room name data in Embodiment 1.

FIG. 10 is a flowchart illustrating conversion processing of room name data.

The conversion unit 166 determines whether a second facility apparatus 120 to be newly installed is a replacement of the first facility apparatus 110, as a processing content (S30). This determination may be performed by inquiring of the user by using the terminal-side display unit 163 and the terminal-side input unit 164, or may be performed by designation using a DIP switch provided in the second management apparatus 140. The content designated by the DIP switch can be obtained in, for example, step S12 of FIG. 8. If the second facility apparatus 120 is a replacement of the first facility apparatus 110 (Yes in step S30), the process proceeds to step S31. If the second facility apparatus 120 is not a replacement of the first facility apparatus 110, but is an apparatus to be installed additionally to the first facility apparatus 110 (No in step S30), the process proceeds to step S32.

In step S31, the conversion unit 166 specifies, as a room name plan of the room name data in the second setting data, a room name indicated by the room name data in the first setting data. The process then proceeds to step S34.

In step S32, the conversion unit 166 determines what number the first management apparatus 130 is in installation order. This determination may be performed by inquiring of the user by using the terminal-side display unit 163 and the terminal-side input unit 164, or may be performed by designation using a DIP switch provided in the second management apparatus 140. The content designated by the DIP switch can be obtained in, for example, step S12 of FIG. 8.

The conversion unit 166 specifies, as a room name plan of room name data of the second setting data, a room name obtained by adding a figure representing the ordinal number, as a suffix to an installation location indicated by the room name data in the first setting data (S33).

When, for example, the installation location of the first management apparatus 130 is "102 Conference Room", and the second management apparatus 140 is a management apparatus installed third, the room name plan is, for example, "102 Conference Room (3)". The process then proceeds to step S34.

In step S34, the conversion unit 166 displays, on the terminal-side display unit 163, the room name plan specified in step S31 or S33, and receives editing and acceptance from the user via the terminal-side input unit 164. When the user accepts the room name plan, the data is temporarily stored for sending to the second management apparatus 140.

Figure 11:
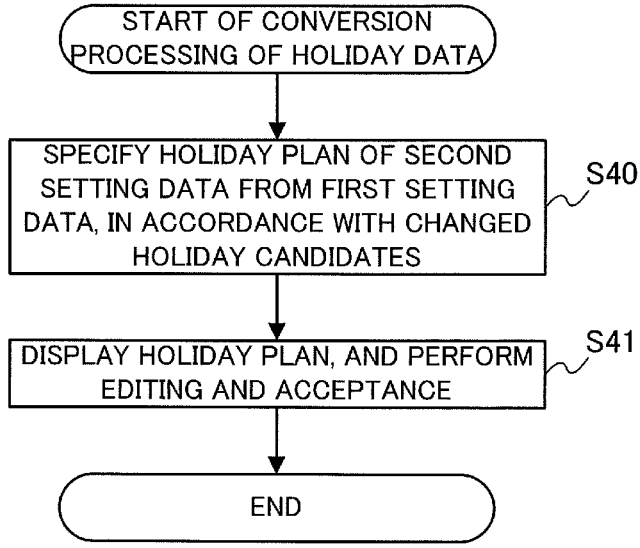
FIG. 11 is a flowchart illustrating conversion processing of holiday data in Embodiment 1.

FIG. 11 is a flowchart illustrating conversion processing of holiday data.

The conversion unit 166 specifies a new holiday plan in accordance with "Changed Holiday Candidates" included in the conversion rule (S40). When, for example, January 1st is excluded from holidays and January 3rd is added to the holidays in a certain country, a holiday plan is generated by "Deleting January 1st from Holidays" and "Adding January 3rd to Holidays".

The conversion unit 166 displays, on the terminal-side display unit 163, the holiday plan specified in step S40, and receives editing and acceptance from the user via the terminal-side input unit 164 (S41). When the user accepts the holiday plan, the data is temporarily stored for sending to the second management apparatus 140.

FIG. 12 is a flowchart illustrating conversion processing of group number data.

The second management apparatus 140 can control only facility apparatuses of one group, or can even control facility apparatuses of a plurality of groups for each group. Therefore, the information processing terminal 160 converts a group number as a control object by conversion processing of group number data.

The conversion unit 166 confirms whether the second management apparatus 140 sets a "Plurality of Groups" as control objects, or a "Specific Group" as a control object, from the user via the terminal-side display unit 163 and the terminal-side input unit 164 (S50). If the second management apparatus 140 sets the "Plurality of Groups" as control objects (Yes in step S50), the process proceeds to step S51; or if the second management apparatus 140 sets the "Specific Group" as a control object (No in step S50), the process proceeds to step S52.

In step S51, the conversion unit 166 instructs the second management apparatus 140 to search for a controllable group, via the first terminal-side communication unit 161. In response to this instruction, the second management apparatus 140 obtains a list of valid group numbers of connected facility apparatuses, from the second facility apparatus 120. The second management apparatus 140 sends the obtained list to the information processing terminal 160 via the second apparatus-side communication unit 141. The conversion unit 166 of the information processing terminal 160 specifies, as a group number plan of the second setting data, a plurality of group numbers included in the list obtained via the first terminal-side communication unit 161.

In step S52, the conversion unit 166 specifies, as a group number plan of the second setting data, a group number included in the first setting data.

The conversion unit 166 displays, on the terminal-side display unit 163, the group number plan specified in step S51 or S52, and receives editing and acceptance from the user via the terminal-side input unit 164 (S53). When the user accepts the group number plan, the data is temporarily stored for sending to the second management apparatus 140.

Conversion processing of schedule data will be described below.

FIGS. 13 to 16 illustrate an example of conversion data included in the conversion rule each.

FIG. 13 is a schematic diagram illustrating an example of operation mode conversion data for converting an operation mode.

Operation mode conversion data 171 is table data including a first facility apparatus column 171a and a second facility apparatus column 171b.

The first facility apparatus column 171a stores an operation mode (to be referred to as a first operation mode hereinafter) provided in the first facility apparatus 110.

The second facility apparatus column 171b stores an operation mode (to be referred to as a second operation mode hereinafter) provided in the second facility apparatus 120.

The operation mode conversion data 171 indicates that a first operation mode stored on a certain row is to be converted into a second operation mode stored on this row.

For example, an operation mode designated as "Cooling" in the schedule data of the first management apparatus 130 is also set as "Cooling" in the second management apparatus 140. However, when, for example, the second facility apparatus 120 connected to the second management apparatus 140 has no heating function, an operation mode designated as "Heating" is converted into "x (Invalid)". "Drying" is converted into "Cooling". The operation mode conversion data 171 defines this operation mode interconversion.

FIG. 14 is a schematic diagram illustrating an example of setting temperature conversion data for converting a setting temperature.

Setting temperature conversion data 172 is table data including a first facility apparatus column 172a and a second facility apparatus column 172b.

The first facility apparatus column 172a stores a setting temperature (to be referred to as a first setting temperature hereinafter) that can be set in the first facility apparatus 110.

The second facility apparatus column 172b stores a setting temperature (to be referred to as a second setting temperature hereinafter) that can be set in the second facility apparatus 120.

The setting temperature conversion data 172 indicates that a first setting temperature stored on a certain row is to be converted into a second setting temperature stored on this row.

There is a case where, for example, a setting temperature can be set in steps of 0.5° C. for the first facility apparatus 110, while a setting temperature can be set only in steps of 1° C. for the second facility apparatus 120. In this case, when "30.5° C." is designated in the first management apparatus 130, it is converted into "30° C." in the second management apparatus 140. As for a lower limit value, when down to 14° C. can be designated in the first facility apparatus 110, while only down to 17° C. can be set in the second facility apparatus 120, "14° C." set in the first management apparatus 130 is converted into "17° C." in the second management apparatus 140.

FIG. 15 is a schematic diagram illustrating an example of air volume conversion data for converting an air volume.

Air volume conversion data 173 is table data including a first facility apparatus column 173a and a second facility apparatus column 173b.

The first facility apparatus column 173a stores an air volume (to be referred to as a first air volume hereinafter) that can be set in the first facility apparatus 110.

The second facility apparatus column 172b stores an air volume (to be referred to as a second air volume hereinafter) that can be set in the second facility apparatus 120.

The air volume conversion data 173 indicates that a first air volume stored on a certain row is to be converted into a second air volume stored on this row.

There is a case where, for example, the first facility apparatus 110 is capable of "Breeze" operation, while the second facility apparatus 120 is capable of only down to "Weak" operation. In this case, "Breeze" designated in the first management apparatus 130 is converted into "Weak" in the second management apparatus 140.

FIG. 16 is a schematic diagram illustrating an example of air direction conversion data for converting an air direction.

Air direction conversion data 174 is table data including a first facility apparatus column 174a and a second facility apparatus column 174b.

The first facility apparatus column 174a stores an air direction (to be referred to as a first air direction hereinafter) that can be set in the first facility apparatus 110.

The second facility apparatus column 174b stores an air direction (to be referred to as a second air direction hereinafter) that can be set in the second facility apparatus 120.

The air direction conversion data 174 indicates that a first air direction stored on a certain row is to be converted into a second air direction stored on this row.

There is a case where, for example, the first facility apparatus 110 is capable of automatic louver operation, while the second facility apparatus 120 is capable of only fixed operation. In this case, "Auto Air Direction" designated in the first management apparatus 130 is converted into "Downward" in the second management apparatus 140.

The conversion unit 166 converts a schedule of schedule data set in the first management apparatus 130, based on the foregoing conversion data, to generate a schedule plan to be set in the second management apparatus 140.

Figure 17:
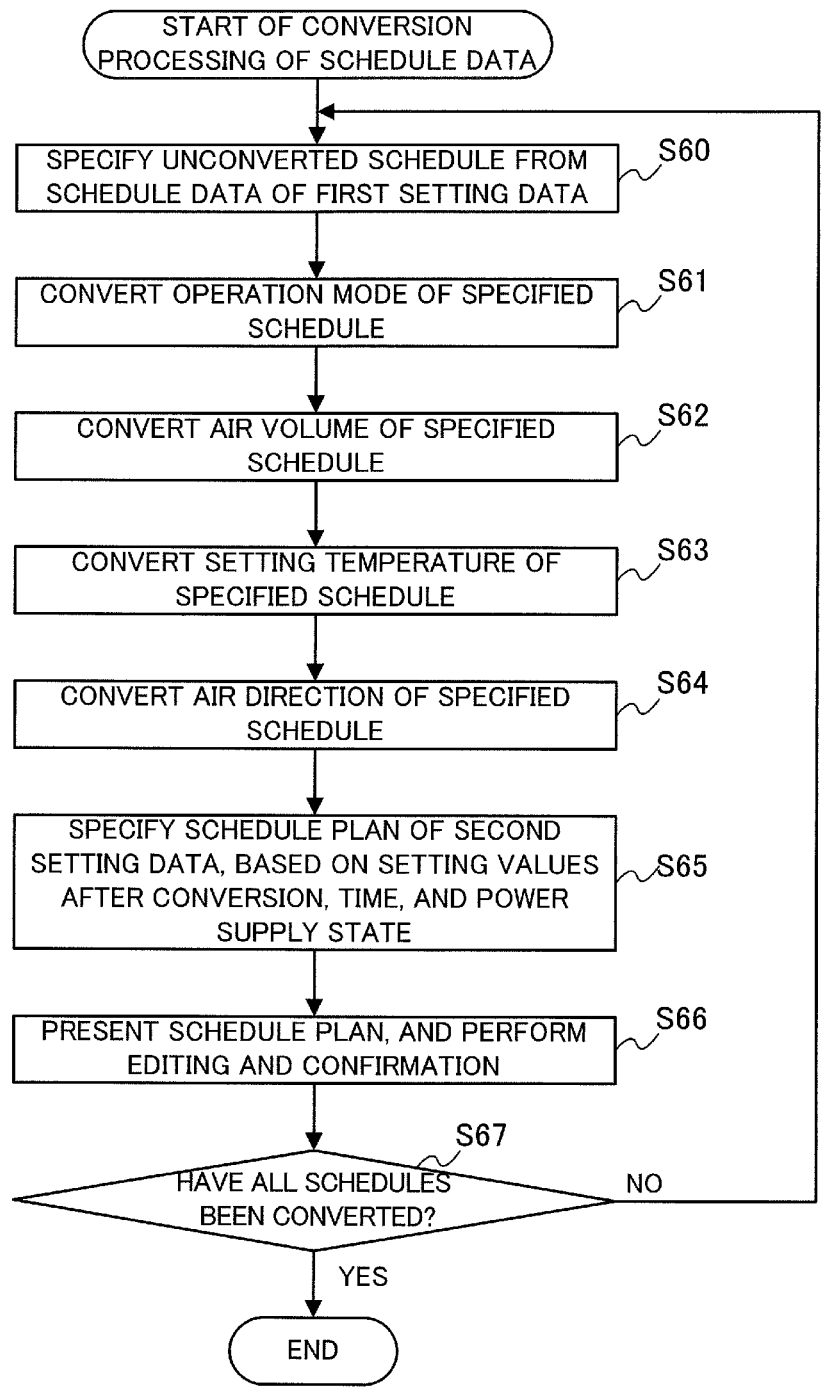
FIG. 17 is a flowchart illustrating conversion processing of schedule data included in the first setting data, based on the conversion data, in Embodiment 1.

FIG. 17 is a flowchart illustrating conversion processing of schedule data included in the first setting data, based on the above-mentioned conversion data.

First, the conversion unit 166 specifies one schedule whose conversion processing has not been performed, from a plurality of schedules defined in schedule data included in the first setting data (S60).

The conversion unit 166 converts the operation mode of the specified schedule based on the operation mode conversion data (S61).

The conversion unit 166 converts the air volume of the specified schedule based on the air volume conversion data (S62).

The conversion unit 166 converts the setting temperature of the specified schedule based on the setting temperature conversion data (S63).

The conversion unit 166 converts the air direction of the specified schedule based on the air direction conversion data (S64).

The conversion unit 166 specifies a schedule plan of the second setting data, based on the setting values converted in steps S61 to S64 and the time and the power supply state of the specified schedule (S65).

The conversion unit 166 displays, on the terminal-side display unit 163, the schedule plan specified in step S65, and receives editing and acceptance from the user via the terminal-side input unit 164 (S66).

Figure 18:
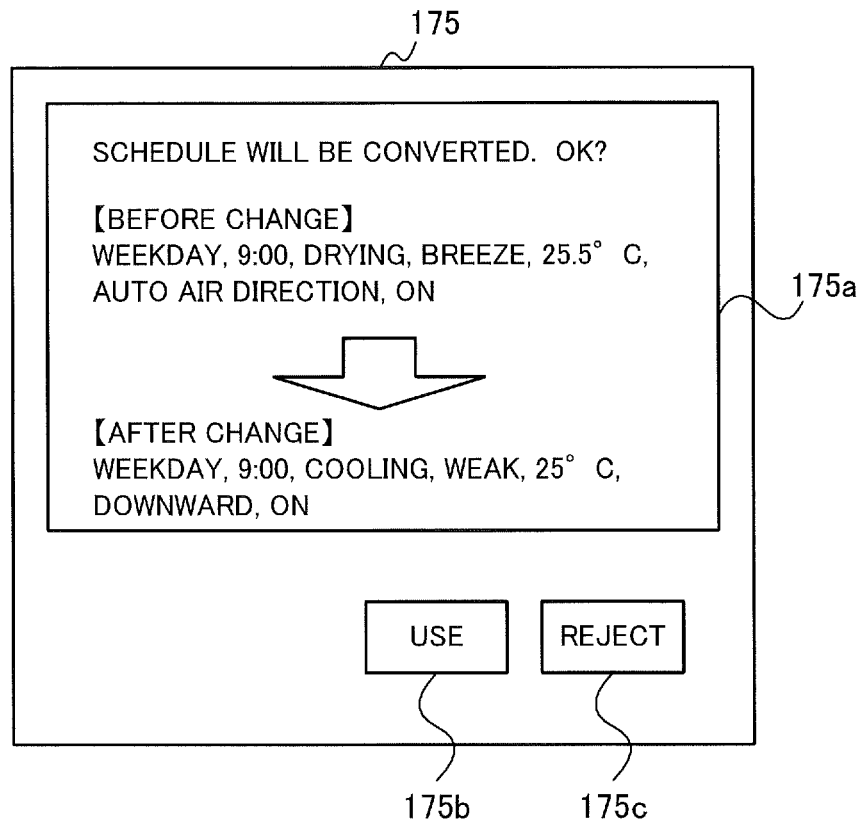
FIG. 18 is a schematic diagram illustrating an example of a schedule plan confirmation screen image in Embodiment 1.

For example, the conversion unit 166 receives confirmation from the user by displaying, on the terminal-side display unit 163, a screen image (schedule plan confirmation screen image) 175 illustrated in FIG. 18. The schedule plan confirmation screen image 175 is an example of a screen image to display, to the user, the schedule plan converted based on the conversion data in order to confirm whether this plan is to be reflected on the second management apparatus 140.

The schedule plan confirmation screen image 175 includes a schedule conversion plan display region 175a, a Use button 175b as a use instruction input region, and a Reject button 175c as a reject instruction input region, as illustrated in FIG. 18.

The schedule conversion plan display region 175a indicates that a schedule "Weekday, 9:00, Drying Operation, Breeze, 25.5° C., Auto Air Direction, ON" set in the first management apparatus 130 is to be converted into "Weekday, 9:00, Cooling Operation, Weak, 25° C., Downward, ON" to be compatible with the second management apparatus 140.

The user presses the Use button 175b when he or she employs this schedule plan, or presses the Reject button 175c when he or she does not employ it. When the Reject button 175c is pressed, this schedule plan is cancelled.

Incidentally, in the schedule conversion plan display region 175a, by pressing a region indicating a setting value which the user want to edit in a schedule plan after a change, he or she can edit the setting value.

Figure 19:
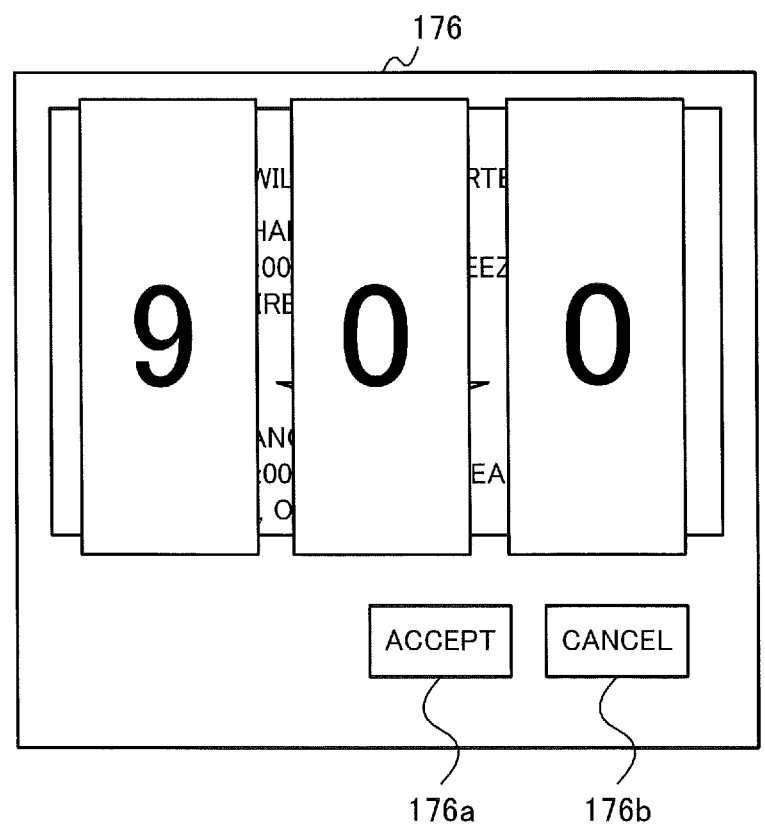
FIG. 19 is a schematic diagram illustrating an example of an editing screen image in Embodiment 1.

For example, FIG. 19 is a diagram illustrating an example of an editing screen image displayed when the user edits a time of day by pressing a region of the time of day in the schedule plan confirmation screen image 175 illustrated in FIG. 18.

As illustrated in FIG. 19, in an editing screen image 176, enlarged digits indicating the time of day are displayed and can be changed by touching each of the digits and sliding it upwards or downwards. After the change, the user accepts the change by pressing a Decide button 176a as a decision instruction input region. In this case, the change is reflected on the schedule plan confirmation screen image and the user can use the schedule plan after the change as second setting data by pressing the Use button.

The user can cancel the change by pressing a Cancel button 176b as a cancellation instruction input region.

With reference to FIG. 17 again, the conversion unit 166 determines whether conversion processing of all schedules defined in the schedule data included in the first setting data has been performed (S67). If the conversion processing has been performed for all the schedules (Yes in step S67), the sequence ends, and the conversion unit 166 stores, as schedule data to be set in the second management apparatus 140, schedule data defining a non-converted schedule and a schedule employed after conversion.

If there remains any schedule which has not been converted (No in step S67), the process returns to step S60.

With the above-mentioned operation, the conversion unit 166 can convert schedule data (first schedule data) included in the first setting data into schedule data (second schedule data) defining a schedule for operating the second facility apparatus 120. The first schedule data defines a schedule for operating the first facility apparatus 110.

FIG. 20 is a flowchart illustrating conversion processing of daylight saving time change date data.

The conversion unit 166 calculates a daylight saving time change date in accordance with a method for calculating a daylight saving time change date included in the conversion rule, and specifies the calculated date as a daylight saving time change date plan of the second setting data (S70).

The conversion unit 166 displays, on the terminal-side display unit 163, the daylight saving time change date plan specified in step S70, and receives editing and acceptance from the user via the terminal-side input unit 164 (S71). When the user accepts the daylight saving time change date plan, the data is temporarily stored for sending to the second management apparatus 140.

According to Embodiment 1, it is possible to easily take over setting data from one management apparatus to another management apparatus.

In particular, schedule data included in setting data can be easily taken over even if the operation functions vary depending on the models.

According to Embodiment 1, since processing and data required to convert setting data are prepared as a conversion rule in advance, the setting data can be easily converted in accordance with the model and the software version in the information processing terminal 160.

Allowing a conversion rule to be downloaded from the server 150 makes it possible to promptly cope with even a situation in which a new facility apparatus is put on the market.

Since second setting data can be sent to the second management apparatus 140 by radio, it is possible to reduce the time and effort to, for example, detach the second management apparatus 140 from a wall surface and remove the board.

In Embodiment 1, first setting data is stored in the first setting database 133 in advance, but Embodiment 1 is not limited to this example. For example, the first control unit 134 may generate first setting data by reading out necessary data from storage devices such as memories (not illustrated) of the first facility apparatus 110 and the first management apparatus 130 when a setting data obtaining request is issued from the information processing terminal 160. The generated first setting data is at least temporarily stored in the first setting database 133.

In Embodiment 1, the model information of the second facility apparatus 120 and the S/W version of the second management apparatus 140 are stored in the second setting database 143, but Embodiment 1 is not limited to this example. For example, the second control unit 144 may obtain model information from the second facility apparatus 120 via the second internal communication unit 142, in response to an information obtaining request.

In Embodiment 1, conversion rules are generated for each combination of a pair of model information and an S/W version of a conversion source and a pair of model information and an S/W version of a conversion destination, and stored in association with this combination, but Embodiment 1 is not limited to this example. For example, conversion rules may be generated for each combination of model information of a conversion source and model information of a conversion destination, and stored in association with this combination. In other words, conversion rules may be generated independently of the S/W versions.

Embodiment 2

FIG. 21 is a block diagram schematically illustrating a configuration of a management system 200 according to Embodiment 2.

The management system 200 includes a first facility apparatus 110, a second facility apparatus 120, a first management apparatus 230, a second management apparatus 140, a server 150, and an information processing terminal 260.

In Embodiment 1, all of the first management apparatus 130, the second management apparatus 140, and the information processing terminal 160 perform communication by radio. Embodiment 2 exemplifies the case where the first management apparatus 230 has no radio communication function.

The first facility apparatus 110, the second facility apparatus 120, the second management apparatus 140, and the server 150 in Embodiment 2 are the same as those in Embodiment 1.

Figure 22:
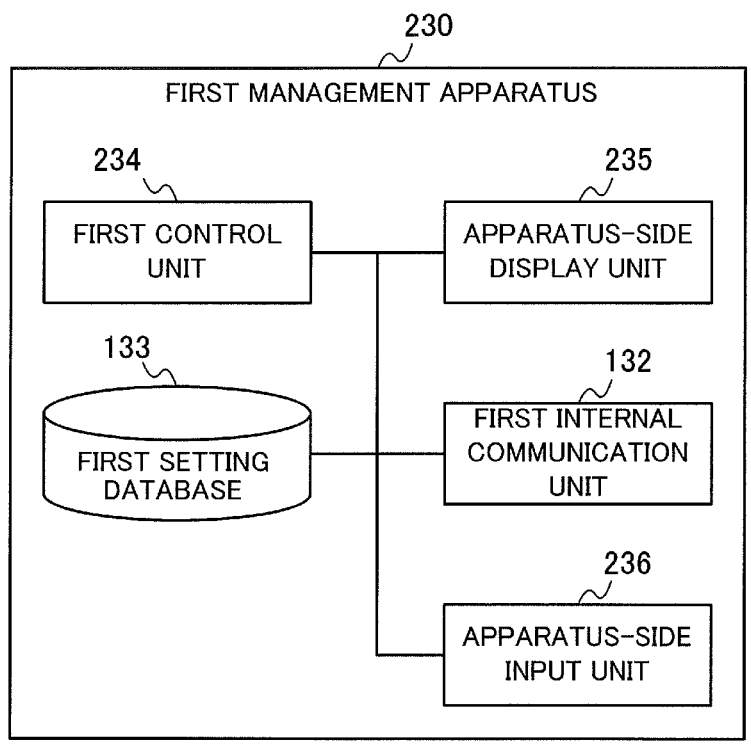
FIG. 22 is a block diagram schematically illustrating a configuration of a first management apparatus in Embodiment 2.

FIG. 22 is a block diagram schematically illustrating a configuration of the first management apparatus 230 in Embodiment 2.

The first management apparatus 230 includes a first internal communication unit 132, a first setting database 133, a first control unit 234, an apparatus-side display unit 235, and an apparatus-side input unit 236.

The first internal communication unit 132 and the first setting database 133 of the first management apparatus 230 in Embodiment 2 are the same as those in Embodiment 1.

The first control unit 234 controls processing in the first management apparatus 230.

For example, the first control unit 234 generates a two-dimensional code by encoding the first setting data stored in the first setting database 133 in response to an instruction whose input is accepted by the apparatus-side input unit 236, and causes the apparatus-side display unit 235 to display the two-dimensional code. This instruction is a setting data display instruction for displaying a two-dimensional code indicating setting data.

The apparatus-side display unit 235 displays various screen images. The apparatus-side display unit 235 displays, for example, a two-dimensional code generated by the first control unit 234. The apparatus-side display unit 235 can be implemented by, for example, a display.

Figure 23:
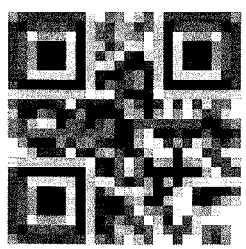
FIG. 23 is a schematic diagram illustrating an example of a two-dimensional code displayed on an apparatus-side display unit in Embodiment 2.

FIG. 23 illustrates an example of a dimensional code displayed on the apparatus-side display unit 235.

The apparatus-side input unit 236 receives input of various instructions from a user. The apparatus-side input unit 236 receives, for example, input of a setting data display instruction. The apparatus-side input unit 236 notifies the first control unit 234 of the input setting data display instruction. The apparatus-side input unit 236 can be implemented by, for example, various buttons.

Figure 24:
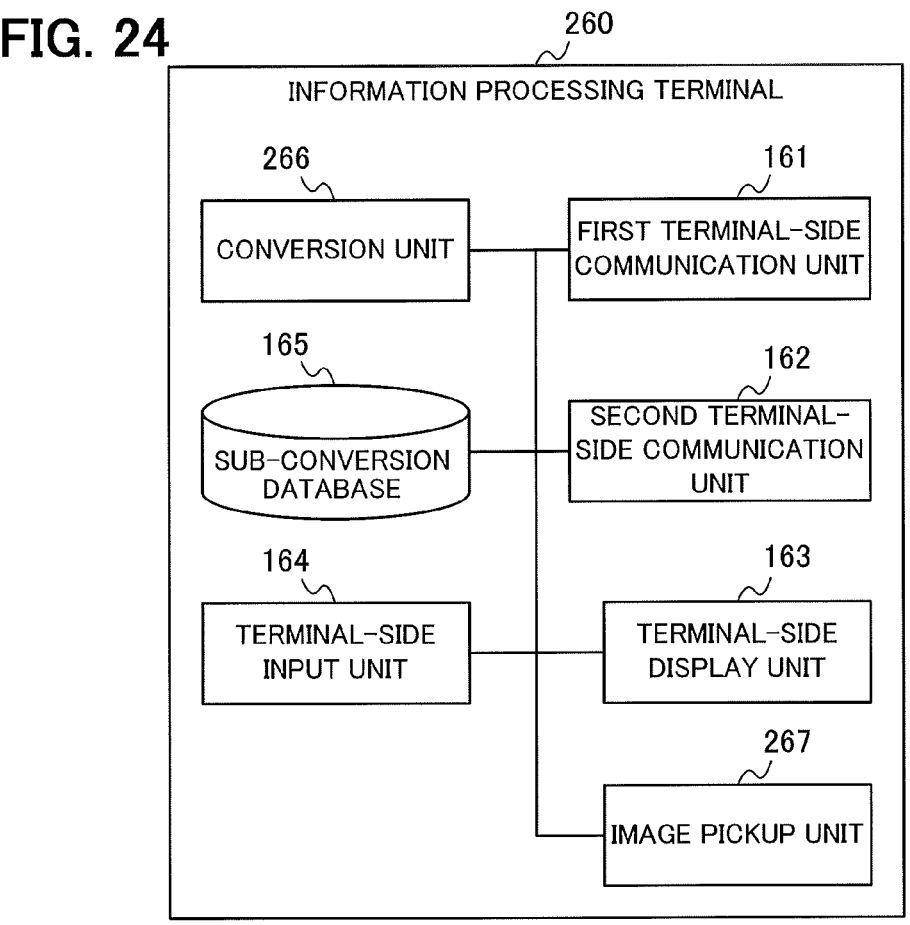
FIG. 24 is a block diagram schematically illustrating a configuration of an information processing terminal in Embodiment 2.

FIG. 24 is a block diagram schematically illustrating a configuration of the information processing terminal 260 in Embodiment 2.

The information processing terminal 260 includes a first terminal-side communication unit 161, a second terminal-side communication unit 162, a terminal-side display unit 163, a terminal-side input unit 164, a sub-conversion database 165, a conversion unit 266, and an image pickup unit 267.

The first terminal-side communication unit 161, the second terminal-side communication unit 162, the terminal-side display unit 163, the terminal-side input unit 164, and the sub-conversion database 165 of the information processing terminal 260 in Embodiment 2 are the same as those in Embodiment 1. However, the first terminal-side communication unit 161 does not perform communication with the first management apparatus 230.

The image pickup unit 267 picks up an image of an object in response to an instruction whose input is received by the terminal-side input unit 164. This instruction is an image pickup instruction for performing image pickup. For example, the image pickup unit 267 picks up an image of a two-dimensional code displayed on the apparatus-side display unit 235 of the first management apparatus 230. The image picked up by the image pickup unit 267 is sent to the conversion unit 266 as a picked-up image. In this case, the image pickup unit 267 can be implemented by a camera.

The conversion unit 266 converts setting data in accordance with a conversion rule.

The conversion unit 266 in Embodiment 2 performs the same processing as that in Embodiment 1, except for processing for obtaining first setting data.

For example, the conversion unit 266 obtains first setting data by decoding a two-dimensional code included in the picked-up image sent from the image pickup unit 267.

Processing of the conversion unit 266 after obtaining first setting data is the same as that in Embodiment 1.

Figure 25:
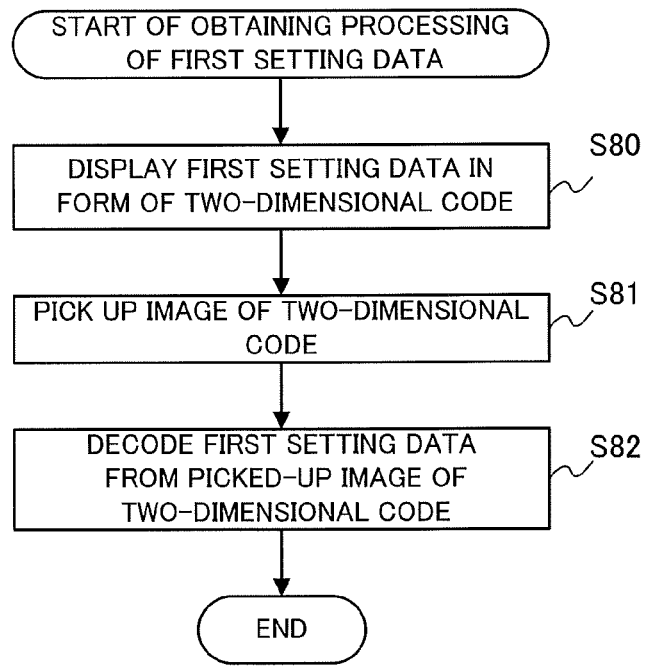
FIG. 25 is a flowchart illustrating processing in which the information processing terminal in Embodiment 2 obtains first setting data from the first management apparatus.

FIG. 25 is a flowchart illustrating processing in which the information processing terminal 260 in Embodiment 2 obtains first setting data from the first management apparatus 230.

When the apparatus-side input unit 236 receives a setting data display instruction, the first control unit 234 of the first management apparatus 230 encodes first setting data to a two-dimensional code and displays the two-dimensional code on the apparatus-side display unit 235 (S80).

When the terminal-side input unit 164 receives input of an image pickup instruction, the image pickup unit 267 of the information processing terminal 260 picks up an image of the two-dimensional code displayed on the apparatus-side display unit 235 (S81).

The conversion unit 266 receives the picked-up image from the image pickup unit 267, and obtains first setting data from the two-dimensional code included in the picked-up image (S82).

As described above, according to Embodiment 2, the information processing terminal 260 can obtain first setting data even if the first management apparatus 230 has no radio communication function.

Embodiment 3

A management system 300 according to Embodiment 3 includes a first facility apparatus 110, a second facility apparatus 120, a first management apparatus 130, a second management apparatus 140, a server 150, and an information processing terminal 360, as illustrated in FIG. 1.

The management system 300 according to Embodiment 3 is configured in the same manner as the management system 100 according to Embodiment 1, except for the information processing terminal 360.

In Embodiment 1, schedule data already set in the second management apparatus 140 is ignored and overwritten. In Embodiment 3, a schedule set in the second management apparatus 140 and a schedule converted from the schedule of the first management apparatus 130 are combined to attain greater convenience when a schedule is already set in the second management apparatus 140.

The information processing terminal 360 includes a first terminal-side communication unit 161, a second terminal-side communication unit 162, a terminal-side display unit 163, a terminal-side input unit 164, a sub-conversion database 165, and a conversion unit 366, as illustrated in FIG. 7.

The first terminal-side communication unit 161, the second terminal-side communication unit 162, the terminal-side display unit 163, the terminal-side input unit 164, and the sub-conversion database 165 of the information processing terminal 360 in Embodiment 3 are the same as those in Embodiment 1.

The conversion unit 366 converts setting data in accordance with a conversion rule.

The conversion unit 366 in Embodiment 3 performs integration processing of schedule data in addition to the same processing in Embodiment 1. The integration processing of schedule data will be described later.

Figure 26:
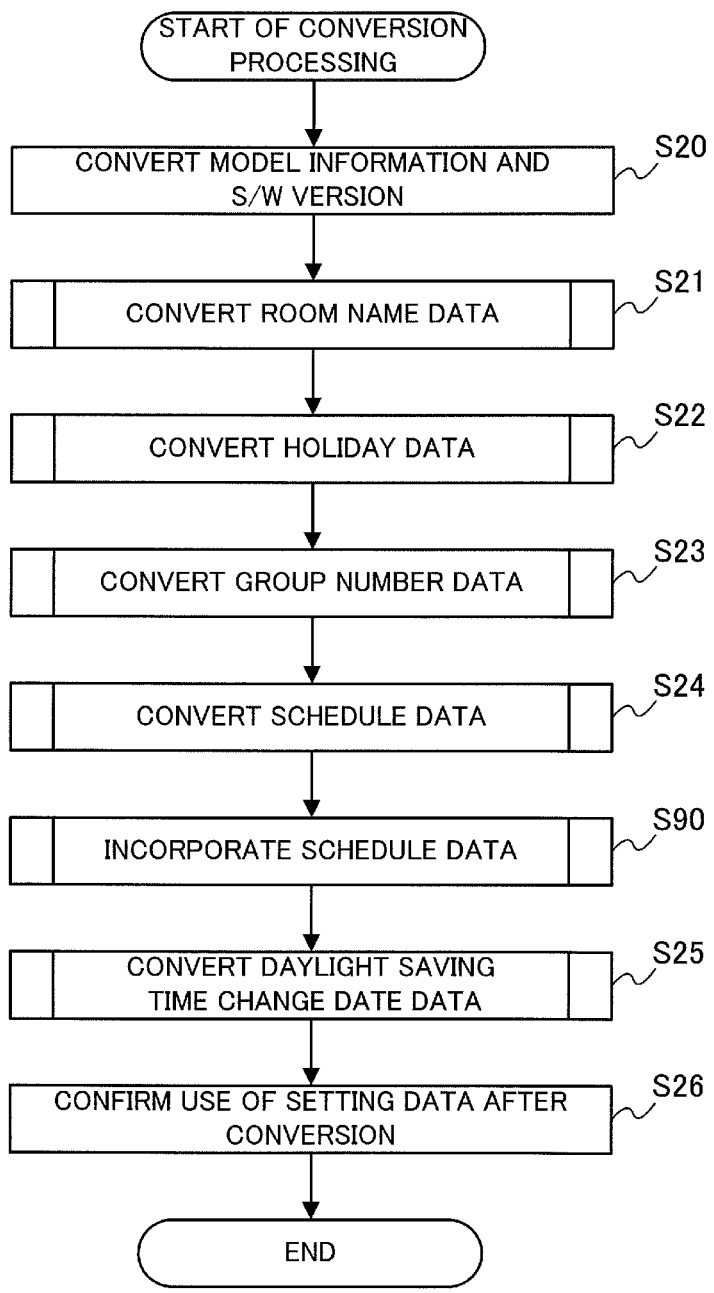
FIG. 26 is a flowchart illustrating conversion processing of setting data in Embodiment 3.

FIG. 26 is a flowchart illustrating conversion processing of setting data in Embodiment 3.

Among steps illustrated in FIG. 26, steps to perform the same processes as those in the steps illustrated in FIG. 9 are denoted by the same reference numerals as in FIG. 9.

The processes in steps S20 to S24 of FIG. 26 are the same as those in steps S20 to S24 of FIG. 9. However, in FIG. 26, the process proceeds to step S90 after step S26.

In step S90, the conversion unit 366 performs integration processing of schedule data. This processing will be described in detail with reference to FIG. 27. The process then proceeds to step S25.

The processes in steps S25 and S26 of FIG. 26 are the same as those in steps S25 and S26 of FIG. 9.

Figure 27:
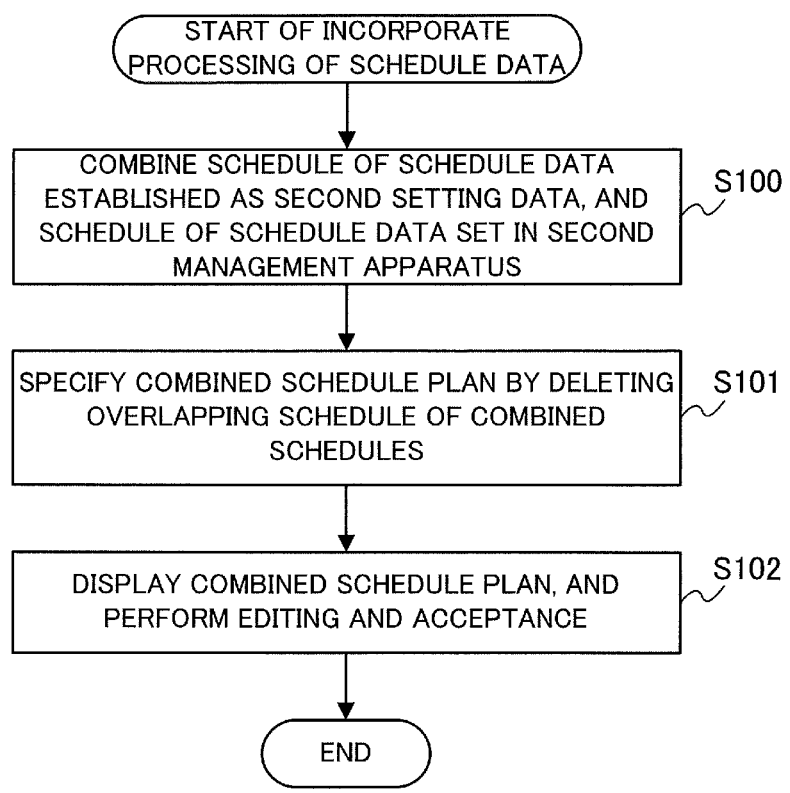
FIG. 27 is a flowchart illustrating integration processing of schedule data in Embodiment 3.

FIG. 27 is a flowchart illustrating integration processing of schedule data in Embodiment 3.

The conversion unit 366 of the information processing terminal 360 obtains schedule data which have been already set from the second management apparatus 140 via the first terminal-side communication unit 161, and adds a schedule defined in the obtained schedule data to the end of a schedule defined in the schedule data converted in step S24 of FIG. 26 (S100). In this case, the schedule data has a plurality of schedules arranged in order from the head.

The conversion unit 366 checks the schedules in turn from the head in the schedule data to which the schedule is added in step S100, and searches for schedules in which both of a setting value indicating a weekday or a holiday and a setting value indicating time overlap each other. If schedules having the overlap are found, a schedule closer to the head is deleted to specify an integrated schedule plan (S101).

More specifically, the conversion unit 366 deletes, out of the schedules converted in step S24 of FIG. 26, a schedule overlapping the schedule already set in the second management apparatus 140.

The conversion unit 366 further displays, on the terminal-side display unit 163, the schedule plan specified in step S65, and receives editing and acceptance from the user via the terminal-side input unit 164 (S102). When the user accepts the schedule plan, the conversion unit 366 temporarily stores the data for sending to the second management apparatus 140.

With the above-mentioned operation, when schedule data (second schedule data) converted from schedule data (first schedule data) included in the first setting data includes a schedule (first schedule) overlapping a schedule (second schedule) defined in schedule data (third schedule data) already set in the second management apparatus 140, the conversion unit 366 can delete the first schedule from the second schedule data, and add the second schedule to the second schedule data.

When the schedule defined in the third schedule data overlaps none of schedules defined in the second schedule data, the conversion unit 366 can add the schedule defined in the third schedule data to the second schedule data. Among schedules defined in the third schedule data, a schedule which does not overlap any schedules defined in the second schedule data is also referred to as a third schedule.

As described above, according to Embodiment 3, when schedule data is already set in the second management apparatus 140, incorporating this schedule data makes it possible to reduce the time and effort for the user to set a schedule again. In addition, any overlap with schedules included in the first setting data can be avoided.

Above-described Embodiment 3 is implemented by making the management system 100 according to Embodiment 1 perform the integration processing of schedule data, but it may be implemented, for example, by making the management system 200 according to Embodiment 2 perform the integration processing of schedule data.

In above-described Embodiment 3, schedule data already set in the second management apparatus 140 is obtained in step S100 of FIG. 27, but Embodiment 3 is not limited to this example. For example, schedule data already set in the second management apparatus 140 may be obtained in step S12 of FIG. 8.

A conversion rule obtained from the server 150 is stored in the sub-conversion database 165 of each of the information processing terminals 160 to 360 in above-described Embodiments 1 to 3, but Embodiments 1 to 3 are not limited to this example. For example, all conversion rules may be stored in the sub-conversion database 165 in the same way as the master conversion database 152 of the server 150. In this case, since the server 150 can be omitted, the second terminal-side communication units 162 of the information processing terminals 160 to 360 can also be omitted.

In this case, the information processing terminals 160 to 360 can implement takeover of setting data even under an environment in which they are not connectable to the Internet 106. When a conversion rule corresponding to the sub-conversion database 165 has not been stored, each of the conversion units 166 to 366 cancels conversion processing, displays information indicating to that cancellation on the terminal-side display unit 163, and warns the user.

What is claimed is:

1. A management system comprising
a first remote controller,
a second remote controller, and
an information processing terminal,
the first remote controller managing operation of a first air conditioner,
the second remote controller managing operation of a second air conditioner, wherein:
the information processing terminal comprises:
a first processing circuitry
to obtain first setting data for managing the operation of the first air conditioner from the first remote controller and
to convert the first setting data into second setting data, the second remote controller being able to use the second setting data; and
a first terminal-side communication device to send the second setting data by radio to the second remote controller;
the second remote controller comprises:
a second apparatus-side communication device to receive the second setting data by radio; and
a second processing circuitry to manage the operation of the second air conditioner by using the second setting data;
the first setting data includes first schedule data defining a schedule including time of day and operation of the first air conditioner at the time of day;
the first processing circuitry converts the first schedule data into second schedule data defining a schedule including time of day and operation of the second air conditioner at the time of day;
when third schedule data defining a schedule for operating the second air conditioner is set in the second remote controller, the first processing circuitry obtains the third schedule data via the first terminal-side communication device; and
when a first schedule defined in the second schedule data overlaps a second schedule defined in the third schedule data, the first processing circuitry deletes the first schedule from the second schedule data, and adds the second schedule to the second schedule data.

2. The management system according to claim 1, wherein the first processing circuitry converts the first setting data into the second setting data in accordance with a conversion rule including a program to execute processing required to convert the first setting data into the second setting data and conversion data indicating a first setting value of the first setting data and a second setting value corresponding to the first setting value in the second setting data.

3. The management system according to claim 2, further comprising
a server to store the conversion rule, wherein
the information processing terminal further comprises a second terminal-side communication device to communicates with the server, and
the first processing circuitry obtains the conversion rule from the server via the second terminal-side communication device.

4. The management system according to claim 1, wherein the first remote controller comprises a first apparatus-side communication device to send the first setting data by radio, and
the first processing circuitry obtains the first setting data from the first remote controller via the first terminal-side communication device.

5. The management system according to claim 1, wherein the first remote controller further comprises an apparatus-side display to display a two-dimensional code generated by encoding the first setting data, the information processing terminal further comprises a camera to pick up an image of the two-dimensional code, and the first processing circuitry obtains the first setting data by decoding the two-dimensional code.

6. The management system according to claim 1, wherein when a third schedule defined in the third schedule data does not overlap any schedules defined in the second schedule data, the first processing circuitry adds the third schedule to the second schedule data.

* * * * *